US008108819B2

(12) United States Patent
Alpert et al.

(10) Patent No.: US 8,108,819 B2
(45) Date of Patent: Jan. 31, 2012

(54) OBJECT PLACEMENT IN INTEGRATED CIRCUIT DESIGN

(75) Inventors: Charles Jay Alpert, Austin, TX (US); Gi-Joon Nam, Austin, TX (US); Jarrod Alexander Roy, Austin, TX (US); Natarajan Vishvanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 12/420,156

(22) Filed: Apr. 8, 2009

(65) Prior Publication Data
US 2010/0262944 A1  Oct. 14, 2010

(51) Int. Cl.
*G06F 17/50* (2006.01)
(52) U.S. Cl. ........ 716/122; 716/111; 716/123; 716/124; 716/129; 716/130; 716/132; 703/16
(58) Field of Classification Search ............... 716/111, 716/122, 123, 124, 129, 130, 132; 703/16
See application file for complete search history.

(56) References Cited

U.S. PATENT DOCUMENTS

| | | | | | |
|---|---|---|---|---|---|
| 4,500,963 | A | * | 2/1985 | Smith et al. | 716/103 |
| 5,793,644 | A | * | 8/1998 | Koford et al. | 716/123 |
| 5,875,117 | A | * | 2/1999 | Jones et al. | 716/124 |
| 6,155,725 | A | * | 12/2000 | Scepanovic et al. | 716/122 |
| 6,349,403 | B1 | * | 2/2002 | Dutta et al. | 716/129 |
| 6,477,688 | B1 | * | 11/2002 | Wallace | 716/107 |
| 6,493,658 | B1 | * | 12/2002 | Koford et al. | 703/1 |
| 7,984,410 | B2 | * | 7/2011 | Chen et al. | 716/119 |
| 2005/0138587 | A1 | * | 6/2005 | Naum | 716/5 |
| 2005/0229137 | A1 | * | 10/2005 | Ito | 716/12 |
| 2007/0245281 | A1 | * | 10/2007 | Riepe et al. | 716/9 |
| 2008/0059931 | A1 | * | 3/2008 | Peters et al. | 716/9 |
| 2008/0216039 | A1 | * | 9/2008 | Furnish et al. | 716/9 |
| 2009/0254874 | A1 | * | 10/2009 | Bose | 716/6 |
| 2010/0257498 | A1 | * | 10/2010 | Alpert et al. | 716/6 |

OTHER PUBLICATIONS

J. A. Roy and I. L. Markov, "ECO-system: Embracing the Change in Placement," IEEE Trans. on CAD, vol. 26, No. 12, pp. 2173-2185, 2007.

C. Chu and M. Pan, "IPR: An Integrated Placement and Routing Algorithm," In proceedings Design Automation Conference (DAC), 2007.

(Continued)

*Primary Examiner* — Phallaka Kik
(74) *Attorney, Agent, or Firm* — Garg Law Firm, PLLC; Rakesh Garg; Libby Z. Toub

(57) ABSTRACT

A method, system, and computer usable program product for an improved object placement in integrated circuit design are provided in the illustrative embodiments. The IC design includes cells, the cells including electronic components, wires, and pins defined for interconnections of the IC. An initial placement corresponding to the design is received. A characteristic of the initial placement is estimated, which may include congestion, pin density, or both in an area of the initial placement. A transformation is performed on a part of the initial placement including the area to improve the characteristic. If the characteristic has improved in the transformed placement, a final placement corresponding to the transformed placement is produced. The transformation may be any combination of resizing an object, weighting a connection, clustering a plurality of objects, shortening of a route taken by a wire, and straightening a bend in a wire in the initial placement.

20 Claims, 10 Drawing Sheets

OTHER PUBLICATIONS

C. Li, M. Xie, C.-K. Koh. J. Cong, and P. H. Madden, "Routability-Driven Placement and White Space Allocation," IEEE Trans. on CAD, vol. 26, No. 5, pp. 858-871, 2007.

U.Brenner and A.Rohe, "An Effective Congestion Driven Placement Framework", ISPD '02, Apr. 7-10, 2002, 6-11, San Diego, CA, USA.

X. Yang, B.Choi, and M. Sarrafzadeh, "Routability Driven White Space Allocation for Fixed-Die Standerd-Cell Placement", ISPD' 02, Apr. 7-10, 2002, 42-47, San Diego, CA, USA.

X. Yang, R. Kastner, and M. Sarrafzadeh, "Congestion Estimation During Top-Down Placement", ISPD' 01, Apr. 1-4, 2001, 164-168, Sonoma, CA, USA.

* cited by examiner

*FIG. 11*
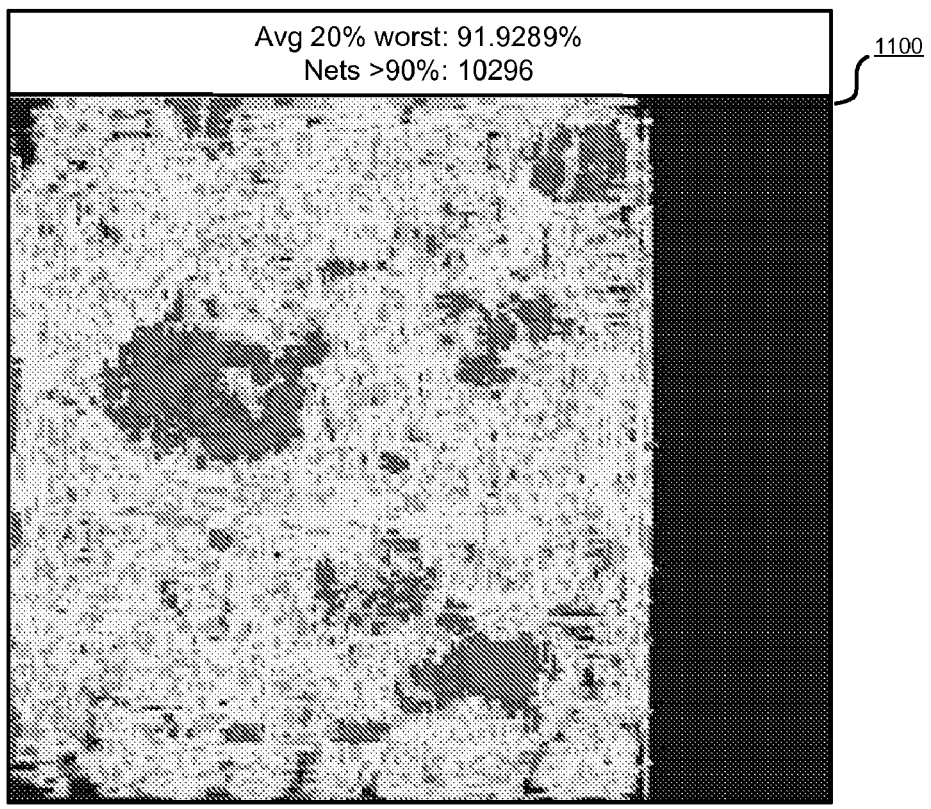
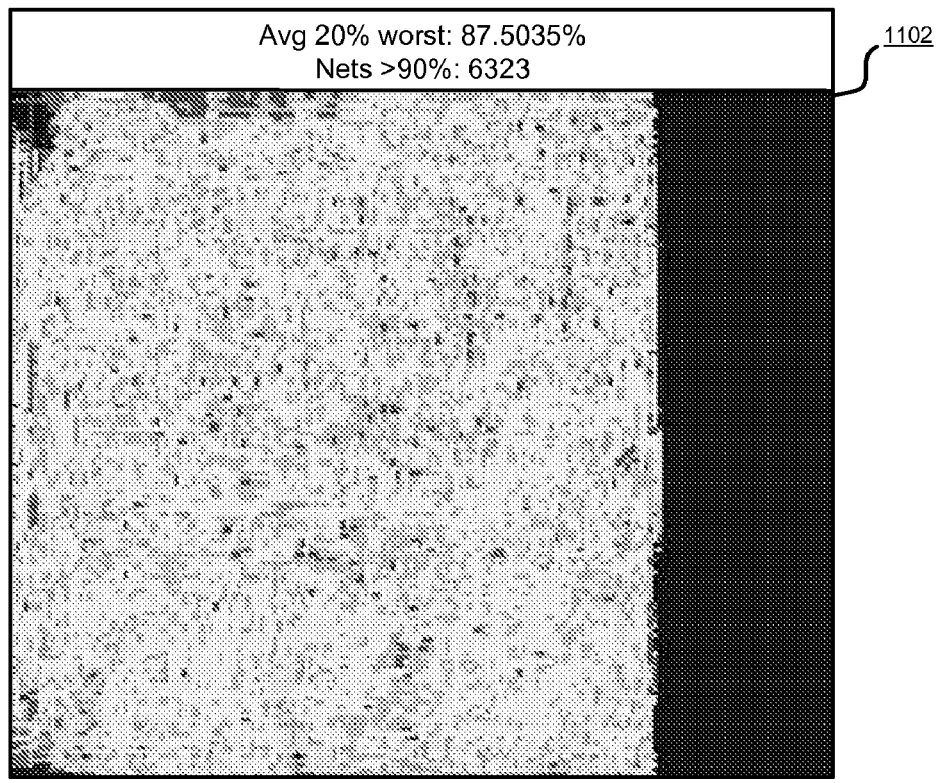

FIG. 12
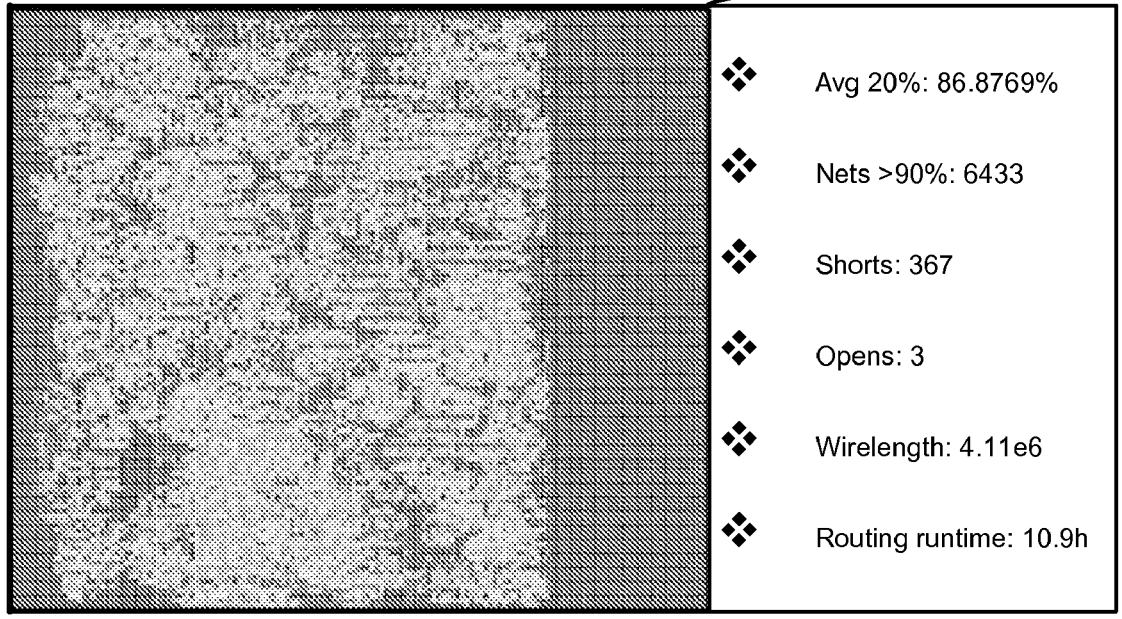
- Avg 20%: 86.8769%
- Nets >90%: 6433
- Shorts: 367
- Opens: 3
- Wirelength: 4.11e6
- Routing runtime: 10.9h
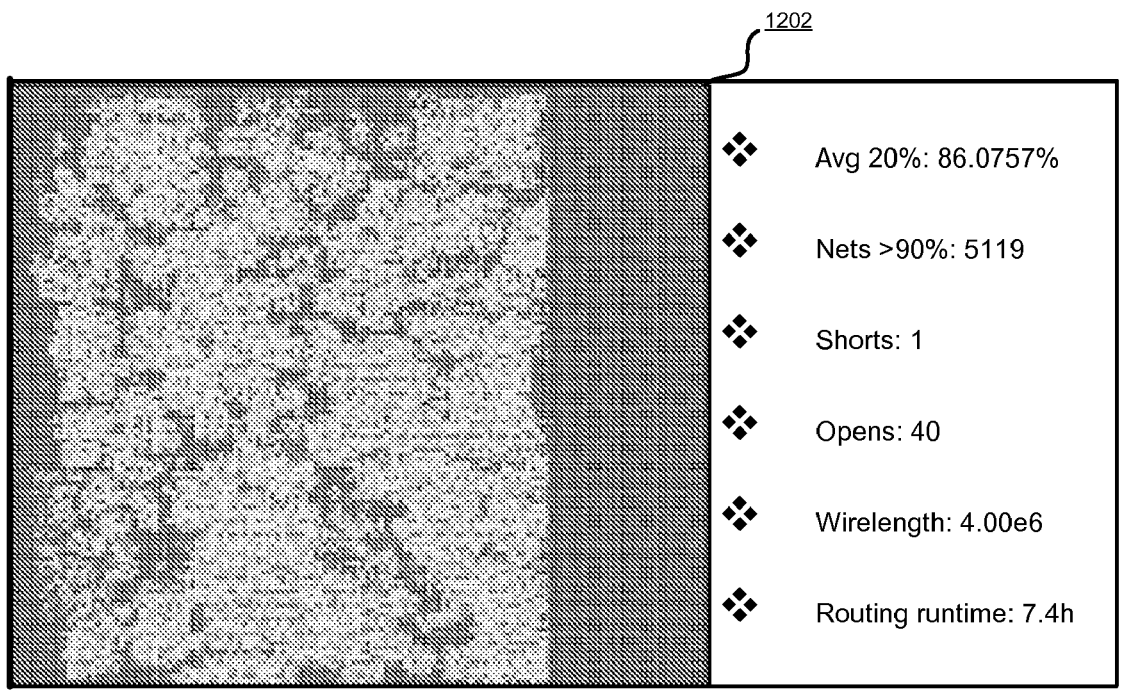
- Avg 20%: 86.0757%
- Nets >90%: 5119
- Shorts: 1
- Opens: 40
- Wirelength: 4.00e6
- Routing runtime: 7.4h

OBJECT PLACEMENT IN INTEGRATED CIRCUIT DESIGN

BACKGROUND OF THE INVENTION

1. Field of the Invention

The present invention relates generally to an improved data processing system, and in particular, to a computer implemented method for integrated circuit design. Still more particularly, the present invention relates to a computer implemented method, system, and computer usable program code for improved object placement in integrated circuit (IC) design.

2. Description of the Related Art

Modern day electronics include components that use integrated circuits. Integrated circuits are electronic circuits formed using Silicon as a substrate and by adding impurities to form solid-state electronic devices, such as transistors, diodes, and resistors. Commonly known as a "chip", an integrated circuit is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including hundreds of thousands of such components interconnected to form an intended electronic circuitry.

The software tools manipulate these components at the components level, or blocks of components level. A block of components is also known as a cell. A cell in an IC design is a portion of the IC design. One way of identifying cells in an IC design is to overlay a grid of imaginary vertical and horizontal lines on the design, and deeming each portion of the IC design bound by horizontal and vertical lines as a cell. Cells formed in this manner are commonly known as global routing cells, or g-cells. Imposing such a grid on an IC design abstracts the global routing problem away from the actual wire implementation and gives a more mathematical representation of the task.

An IC design software tool can, among other functions, manipulate cells, or interconnect components of one cell with components of other cells. The interconnects between components are called wires. A wire is a connection between parts of electronic components, and is formed using a metallic material that conducts electricity.

SUMMARY OF THE INVENTION

The illustrative embodiments provide a method, system, and computer usable program product for an improved object placement in integrated circuit design. The IC design has cells, the cells including representation of electronic components, wires, and pins defined for interconnections in the IC. An initial placement corresponding to the design is received. A characteristic of the initial placement is estimated. The characteristic may include wiring congestion, pin density, or both the congestion and the pin density in an area of the initial placement. A transformation is performed on a part of the initial placement to form a transformed placement. The part may include the area of the initial placement and the transformation may be capable of improving the characteristic in the transformed placement as compared to the characteristic in the initial placement. A determination is made whether the characteristic has improved in the transformed placement by re-estimating the characteristic in the transformed placement. A final placement corresponding to the transformed placement is produced responsive to an improvement in the characteristic. The final placement represents a new design of the integrated circuit.

In an embodiment, the transformed placement may be legalized. Additionally, performing the transformation may be repeated responsive to the improvement in the characteristic, making the transformed placement the initial placement, producing a second transformed placement, and making the second transformed placement the transformed placement.

In another embodiment, producing the final placement may be performed if the characteristic in the transformed placement has improved. The characteristic may improve if the value of the characteristic in the transformed placement is above a threshold value of the improvement as compared to the characteristic in the initial placement but not above the threshold value as compared to the characteristic in a previous transformed placement.

In another embodiment, the characteristic may be congestion in the area. Improving the congestion in the area may reduce the congestion in the area in the transformed placement by a preset amount.

In another embodiment, the characteristic may be pin density in the area. Improving the pin density in the area may reduce the pin density in the area in the transformed placement by a preset amount.

In another embodiment, the characteristic may also include a total wire length in all or a part of the design. Consequently, improving the characteristic may include reducing the total wire length in the transformed placement by a preset amount.

In another embodiment, the estimating and the re-estimating are each performed using a global router. The global router may be a component of an IC design tool.

In another embodiment, the transformation may be any combination of resizing an object in the initial placement, weighting a connection in the initial placement, clustering a plurality of objects in the initial placement, shortening of a route taken by a wire in the initial placement by moving an object along the route, and straightening a bend in a wire in the initial placement by re-placing an object and re-routing the wire. The transformation may combine any number of these and other techniques in any order.

In another embodiment, performing the transformation may improve a global routing and a detailed routing using the transformed placement. In one embodiment, improving the global routing may include reducing the congestion in the area of the transformed placement, and improving the detailed routing may include reducing the pin density in the area.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 11 depicts a rendering of an IC design with a measurement of the reduced congestion in accordance with an illustrative embodiment;

FIG. 12 depicts a rendering of an IC design with a measurement of the reduced pin density in accordance with an illustrative embodiment.

DETAILED DESCRIPTION OF THE PREFERRED EMBODIMENT

Figure 1:
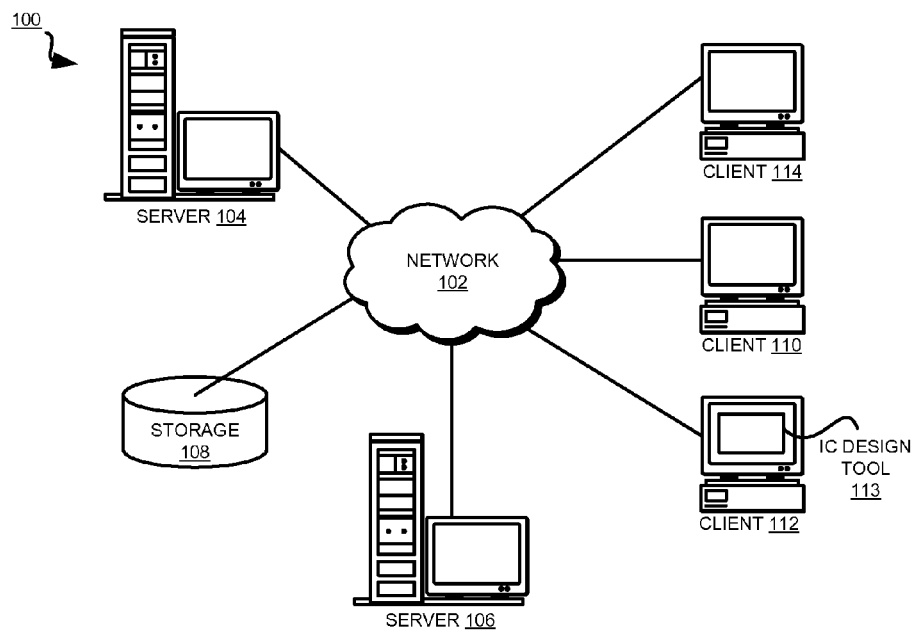
FIG. 1 depicts a pictorial representation of a network of data processing systems in which illustrative embodiments may be implemented.

In a portion of the IC design process, IC design tools generally employ various steps in producing an IC design that works as intended. A circuit designer generally creates the design in a computer programming language in the form of code. The IC design tool accepts the design in the code form and generates a rendering of the design in multiple layers that have be formed in a semiconducting material to create a circuit according to that design.

The IC design tool identifies cells in the design. The IC design tool manipulates a set of the cells to legalize the design. A set of cells is one or more cells. Legalizing the design is manipulating the cells so no cells overlap each other in the rendering or when formed in the semiconducting material. A legal design results from the legalizing operation. Cells are generally allowed to touch other cells but not overlap in a legal design.

A type of cell in an IC design is known as a standard cell. A standard cell is combination of solid-state devices, such as transistors, which take a specified number of input signals and produce a specified number of output signals, and which implement one or more circuit functions, such as logical AND, or logical OR functions. Generally, a standard cell is shaped as a rectangle that is fixed in height but variable in width. In some cases double height cells are also used. IC designs usually include a number of "standard rows" of standard cells, all with the same height that matches the height of a standard cell.

A given cell includes a set of components and their interconnections. A set of components is one or more components. A cell may also include pins. A pin of a cell is a point of interconnection in the cell where a wire may be connected to couple a component of the cell with a component of another cell. In other words, pins of a cell are the locations of input/output (I/O) to and from the cell.

A set of pins for forming electrical connections in a cell is called a net. A Net list is a list of nets of a set of cells.

The interconnects are formed using wires. The illustrative embodiments recognize that minimizing the length of each wire in a given design is a design consideration in the design of the IC. The illustrative embodiments further recognize that for avoiding electrical short circuits, for being able to print the wires in photolithography manufacturing, and for other reasons, only a predetermined amount of metal that forms the wires can occupy a given cell. In other words, only a certain amount of metal wires may occupy a routing g-cell. For similar reasons, the illustrative embodiments further recognize that the wires have to be placed at a predetermined minimum separation from one another.

Congestion is overcrowding of wires in a cell area. The illustrative embodiments recognize that placing more than the predetermined maximum number of wires in a cell area can cause congestion. The illustrative embodiments also recognize that placing wires closer than the predetermined minimum separation can also result in congestion.

Presently available IC design tools move cells from one part of the design to another part of the design to achieve certain design objectives. Such movement and positioning of cells in a rendering of an IC design is called placement. The illustrative embodiments recognize that placement of cells is a factor in creating the congestion. For example, the illustrative embodiments recognize that placing a certain first cell adjacent to a certain second cell may cause a certain number of wires to cross over a certain third cell without causing congestion in the metallic layers of the area of the third cell. However, if the first cell is placed adjacent to a fourth cell, the number of wires crossing over the third cell may increase to result in congestion in that area.

The number of components in a chip is an indication of the density of the chip. It is not uncommon for a present chip to accommodate tens of millions of components per square millimeter. Placement problem is the problem of placing the cells of a chip such that the design meets all the design parameters of the chip. The illustrative embodiments recognize that with increasing density of the chip, the placement problem becomes increasingly complex. Furthermore, the probability of encountering a difficult to solve placement problem also increases with the increasing density.

Solving a placement problem is computationally expensive as it consumes significant time and computing resources. The illustrative embodiments recognize that given a design, present IC design tools perform an estimation of placement and progress the design manipulation with that estimate.

Routing is the process of connecting the pins after placement. In other words, placement results in a rendering of the components of various cells as being located in certain positions in the design, whereas routing results in a rendering of how the metal layers would be populated with that placement.

Generally, a metallic layer is designated to be occupied by only horizontally running wires (X axis) or only vertically running wires (Y axis). One or more metallic layers may carry the horizontal wires in a design, and one or more metallic layers may carry the vertical wires. A connection between metal wires on different layers is called a "via". These vias, or connectors, in Z axis are rendered between some metallic layers. These connectors connect some horizontal wires on one layer with some vertical wires on another layer to create an end-to-end connection that has one or more perpendicular bends.

Router is a component of IC design tools that performs the routing function. Once the placement component—known as a placer—has performed the placement function, the router attempts to connect the wires without causing congestion. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas—cell areas where wires may not be routed.

Global routing is the process of connecting pins of one cell to the pins of other cells. In other words, global routing is the process of connecting the cells with one another. Detailed routing is the process of connecting the components within cells with one another. A type of router—known as the global router—performs the global routing. Another type of router—known as the detailed router—performs the detailed routing.

The illustrative embodiments recognize that occasionally, the router may be unable to perform the wiring within the design constraints. For example, the router may not be able to perform the wiring without placing at least seven wires in an area that may be constrained to have only five wires. Accordingly, the IC design tool renders the placement and wiring with the congested areas highlighted. For example, an IC design tool may render the design with red and pink areas depicting the congested cells. The IC design tool may render the design with green and blue areas depicting cells not suffering from congestion.

The illustrative embodiments recognize that presently, manual intervention is needed to resolve congestion in a routed design. The illustrative embodiments recognize that presently, a circuit designer attempts to manually redesign a part of the design to resolve the congestion. The circuit designer may also attempt to manually re-place certain cells in an attempt to minimize congestion.

The illustrative embodiments further recognize that congestion is also a result of pin density in the cells. Pin density is a combination of the number of pins in a cell and the proximity of those pins to one another and to the pins of adjacent cells. The illustrative embodiments recognize that the higher the pin density is in a cell, the more likely is a congestion problem in that cell or adjacent cells.

The illustrative embodiments recognize that presently used IC design tools and presently used manual congestion resolving methods do not consider pin density as a factor. Consequently, the illustrative embodiments recognize that present solutions do not solve design issues related to pin density.

For example, presently used design tools and manual congestion solutions assume that if a global routing appears to be satisfactory, the detailed routing will also be satisfactory. The illustrative embodiments recognize that such is not always the case. For example, cell-to-cell interconnections in a given design may be small enough to comply with a congestion constraint. For such a design, performing the global routing step may show no congestion at all. However, the particular design may have a large enough number of interconnects between the components within a certain cell such that only upon detailed routing the congestion will become obvious.

The illustrative embodiments recognize that such problems generally manifest in designs where the pin densities of certain cells exceeds a threshold pin density for that design. Because performing the detailed routing is computationally expensive, present techniques do not encounter the congestion from detailed routing until late in design. When the congestion during detailed routing is encountered in present techniques, the techniques attempt to resolve, once again, the congestion as described above. Consequently, the illustrative embodiments recognize that present solutions do not solve design issues related to pin density.

To address these and other related problems in present methods of remedying congestion in IC design, the illustrative embodiments provide a method, computer usable program product, and data processing system for improved object placement in integrated circuit design. Using the illustrative embodiments, an IC design tool can be improved to make global and detailed routing-aware placement repairs in the design.

Furthermore, using the illustrative embodiments, the placement repairs, or corrections, can be made in an automated fashion, which may reduce errors caused and time consumed in presently used manual methods. The illustrative embodiments may be used to identify pin density problems in a design. The illustrative embodiments may provide solutions for reducing pin densities in cells that may result in congestion much later in the design cycle.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, designs, layouts, schematics, and tools only as examples and are not limiting on the illustrative embodiments. The illustrative embodiments may be implemented with respect to any type of design data and any type of circuit that can be produced using an IC design tool. Furthermore, the illustrative embodiments are described in some instances using particular software tools and data processing environments only as an example for the clarity of the description. The illustrative embodiments may be used in conjunction with other comparable or similarly purposed systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
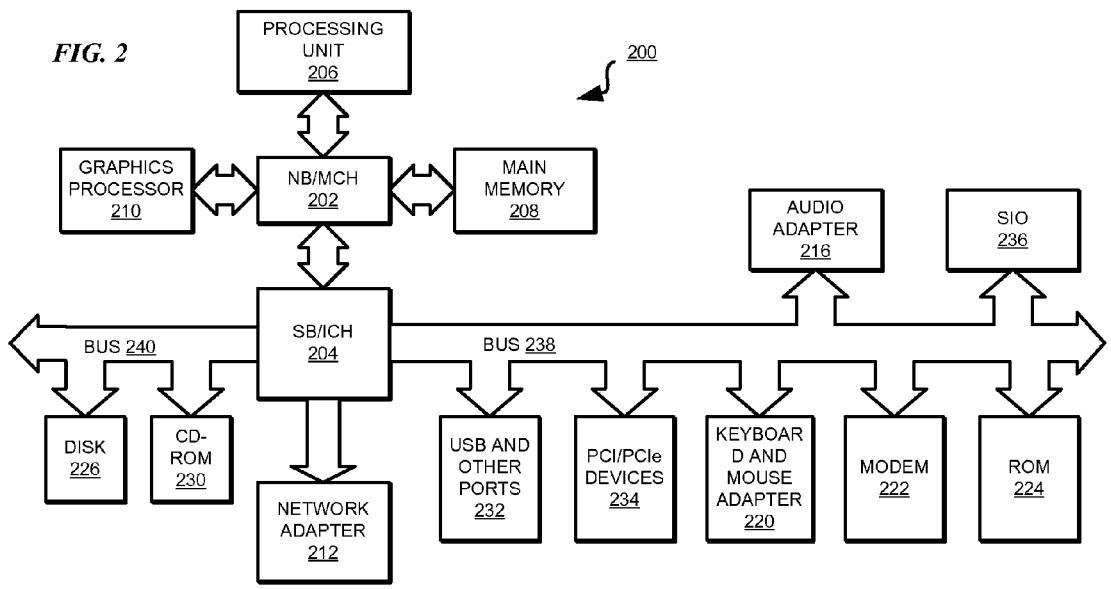
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may have software applications or software tools executing thereon. For example, client 112 may include IC design tool 113.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
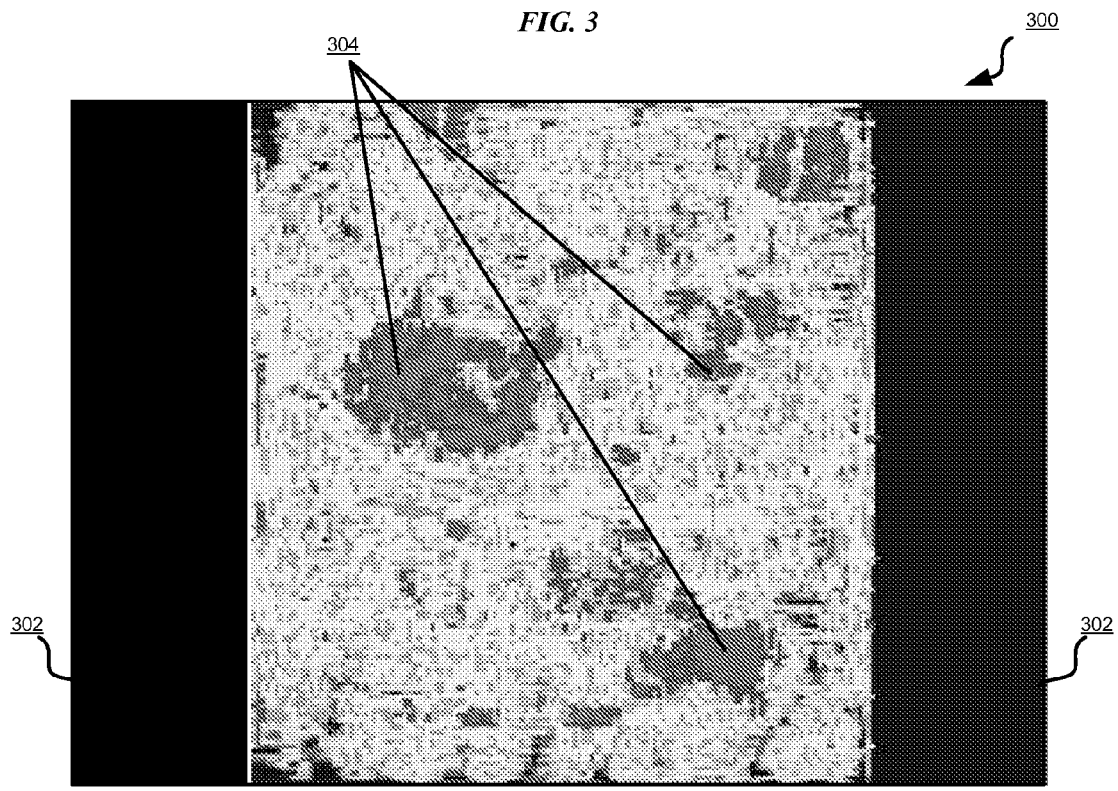
FIG. 3 depicts a rendering of an IC design showing congestion with respect to which an illustrative embodiment may be used.

With reference to FIG. 3, this figure depicts a rendering of an IC design showing congestion with respect to which an illustrative embodiment may be used. Rendering 300 may be produced, displayed, or both by an IC design tool, such as IC design tool 113 in FIG. 1.

Rendering 300 is a visual representation of an example design of an IC. The numerous rectangular blocks that form rendering 300 are rendering of the numerous g-cells that constitute the example design. Areas 302 are rendered dark in FIG. 3 but may be rendered in any color in a given IC design tool. Areas 302 represent blocked areas where no metal can be placed.

Areas 304 are sets of cells within the example design that are rendered in a dark color as well. Areas 304 represent areas of congestion in example rendering 300. A particular IC design tool may be configured to render the blocked areas and various levels of congestion in any manner suitable for an implementation of the illustrative embodiments.

Remedying the areas of congestion, such as areas 304, generally causes the global router to detour the wiring around those areas, such as when a circuit designer manually re-places or redesigns some of the cells. However, the illustrative embodiments recognize that detouring the wiring in this manner causes degraded circuit performance and increased dependencies of cells on one another. In some instances, the detouring may not even be possible due to the nature of the design, or design constraints.

Figure 4:
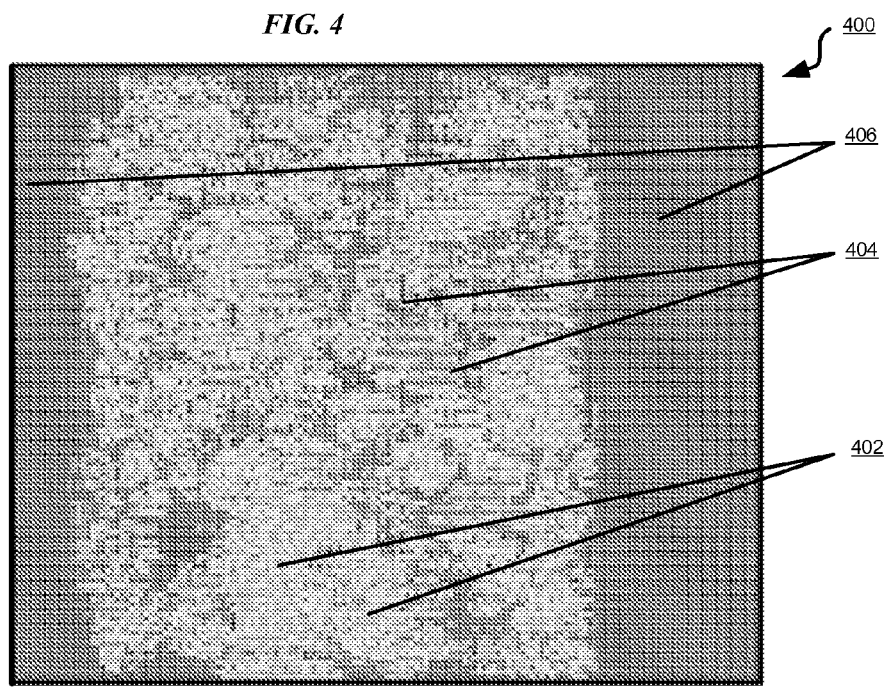
FIG. 4 depicts a rendering of an IC design showing pin densities with respect to which an illustrative embodiment may be used.

With reference to FIG. 4, this figure depicts a rendering of an IC design showing pin densities with respect to which an illustrative embodiment may be used. Rendering 400 may be produced, displayed, or both by an IC design tool, such as IC design tool 113 in FIG. 1.

Rendering 400 is a visual representation of an example design of an IC. The numerous rectangular blocks that form rendering 400 are rendering of the numerous cells that constitute the example design. Areas 402 are rendered in a light color in FIG. 4 but may be rendered in any color in a given IC design tool. Areas 402 represent cells whose pin densities are within a present tolerance limit.

Areas 404 are sets of cells within the example design that are rendered in a dark color. Areas 404 represent areas where the pin densities are higher than the present tolerance limit in example rendering 400. Areas 406 represent blocked areas where no cells, and consequently no pins, exist. A particular IC design tool may be configured to render the various pin densities in any manner, including any color, suitable for an implementation of the illustrative embodiments.

The illustrative embodiments recognize that placement of cells using a placer presently tends to pack together the cells with higher than a threshold pin density. This deliberate approach of placers reduces wire lengths, which is a desirable consideration in a design and results in reducing congestion in global routing.

However, the illustrative embodiments recognize that this same deliberate approach burdens the detailed routing step later during the design cycle and results in an increased occurrence of detailed routing congestion. The illustrative embodiments further recognize that remedying the detailed routing congestion consumes considerable computing resource and deteriorates the performance of the designed circuit. The illustrative embodiments also recognize that remedying detailed routing congestion in the present manner often results in a higher number of short circuits or open circuit errors in the design as compared to when the illustrative embodiments described herein are used.

For solving these and other related problems in IC design, the illustrative embodiments accept an initial placement and analyze the global routing congestion as well as pin density. The illustrative embodiments then identify the areas that are most congested, pin-dense, or both. Within these identified areas, the illustrative embodiments begin the remediation process by artificially increasing the size of some standard cells. The artificial increase in the size of the standard cells creates one or more illegality in the design. The illegality may be rendered as illegal areas in the design.

Continuing the remediation process, the illustrative embodiments move cells from these illegal areas while considering the total wire length increase or decrease. The illustrative embodiments also take into account any disturbance or deterioration of those parts of the design that are not congested, pin-dense, or both at the beginning of the remediation process.

The illustrative embodiments execute a legalizer. A legalizer is a component of IC design tools that legalizes an illegal design by manipulating the design to remove the illegality. The illustrative embodiments may further use detailed placement techniques to reduce the total wire length resulting from the previous steps.

A detailed placement technique may be any technique that considers a legal placement, modifies cell positions with a specific design goal, such as the goal of reducing total wire length, and produces a legal placement as output. Commonly, a given detailed placement technique examines a very small region of a design (only several standard cells) and manipulates them while holding all others in the design fixed. A detailed placement technique proceeds in this fashion and examines small groups of standard cells until all standard cells have been examined. This process can be repeated a number of times for further improvement. One simple example of a detailed placement technique is to choose two standard cells that may be connected by one or more nets and swap their positions if that swapping results in a net reduction in total wire length.

Returning to the sequence of steps of the illustrative embodiment, this sequence of steps is repeated until no congestion remains, no areas of higher than threshold pin density remain, no significant improvement in congestion or pin densities is evident, or a combination thereof. For example, an implementation of the illustrative embodiments may terminate the execution when the total percentage of congested cells is less than three percent of the total cell area.

As another example, another implementation may terminate the execution of the illustrative embodiments when the reduction in congestion in the output design is less than five percent of the congestion of the input design. These examples of percentages and exit considerations are described here only as examples and are not limiting on the illustrative embodiments. Many other ways of exiting the execution of the illustrative embodiments will be apparent from this disclosure. FIGS. 5-9 depict several example ways of implementing the steps and processes of the illustrative embodiments.

Figure 5:
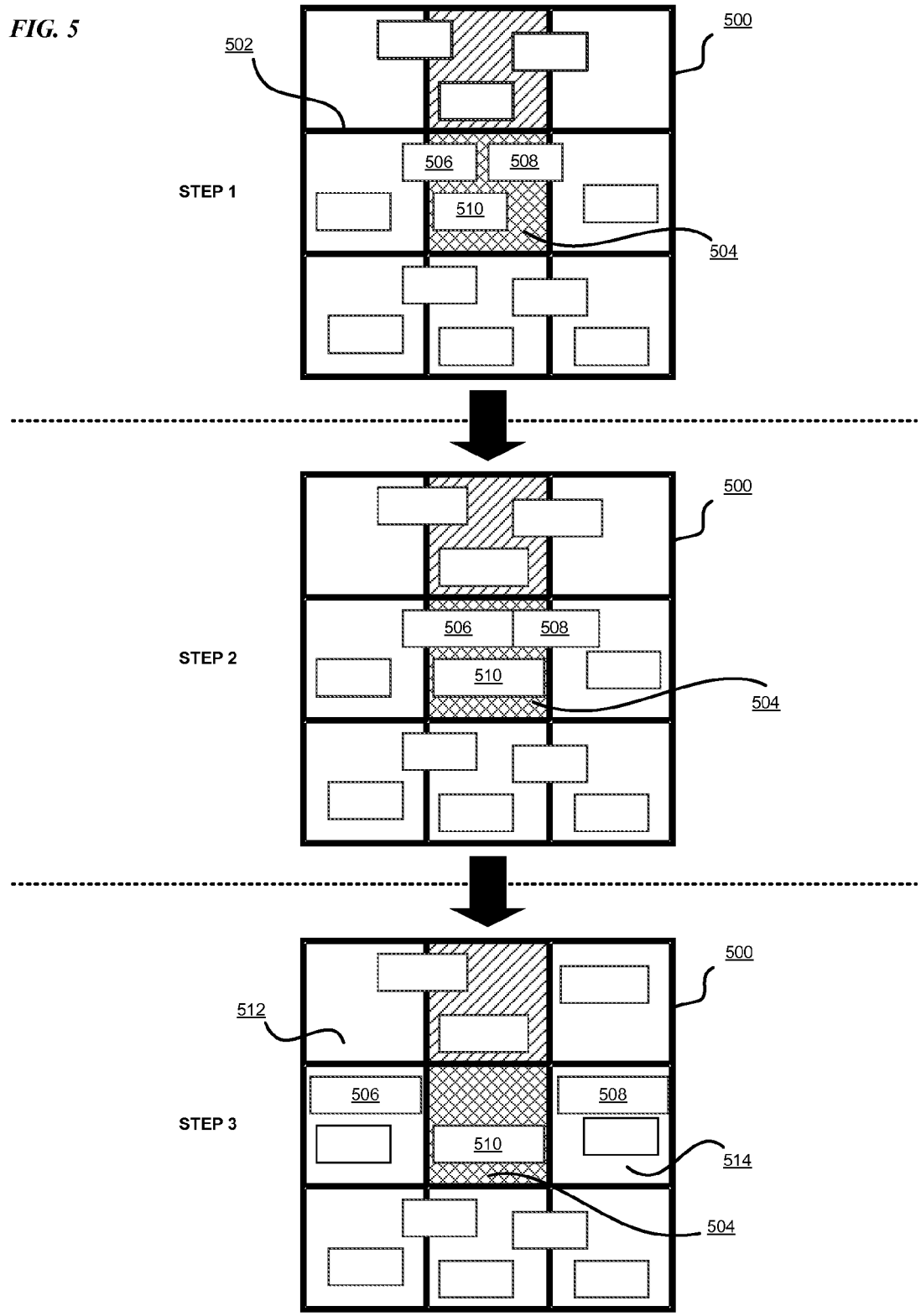
FIG. 5 depicts a block diagram of a process of object resizing in accordance with an illustrative embodiment.

With reference to FIG. 5, this figure depicts a block diagram of a process of object resizing in accordance with an illustrative embodiment. Rendering 500 may be a rendering of an example design, such as rendering 300 in FIG. 3 or rendering 400 in FIG. 4.

Grid 502 may be a grid for partitioning rendering 500 for analysis, placement, and routing. In step 1 in this figure, an illustrative embodiment may identify area 504 as congested, pin-dense, or both. For example, standard cells 506, 508, and 510 may be partially or fully occupying area 504 in rendering 500. A particular implementation of the illustrative embodiments may choose to depict congested and pin-dense areas differently or similarly within the scope of the illustrative embodiments.

In step 2 of this figure, the illustrative embodiment may select some or all objects from the congested or pin-dense region and resize those objects. An object may be a standard cell or a component thereof. As an example, in this figure, objects 506, 508, and 510 that occupy area 504 are shown to have been enlarged.

Before performing this operation, the illustrative embodiment may reconfigure an IC design tool to give priority to the area taken by a standard cell over the routing optimization for moving a cell. In other words, the illustrative embodiment may reconfigure the IC design tool such that a standard cell whose area demand is higher is moved even if such move deteriorates routing optimization.

In this manner, the illustrative embodiment may resize a set of objects in areas that are consistently congested, or areas that are more congested than a threshold congestion, to be larger than objects in other areas. A set of objects is one or more objects. An implementation of the illustrative embodiments may also include a capacity threshold to limit the resizing in various areas. The capacity threshold may be variable based on the comparative amounts of congestion, pin density or both of the various areas.

Resizing objects 506, 508, and 510, as in step 2 above, may create an illegality in rendering 500 in step 2. In step 3 of this figure, the illustrative embodiment may apply an existing technique, such as using a legalizer, to legalize the illegal rendering 500 of step 2. The illustrative embodiment may also employ wire length reduction techniques, incremental placement techniques, or a combination of other presently used techniques in the process of removing the illegality.

As seen in step 3 of this figure, rendering 500 in step 3 is a rendering of a legal design. Resized standard cell 506 has been re-placed in area 512, resized standard cell 508 has be re-placed in area 514, and resized standard cell 510 has been retained in area 504, which is no longer congested, pin-dense, or both.

Figure 6:
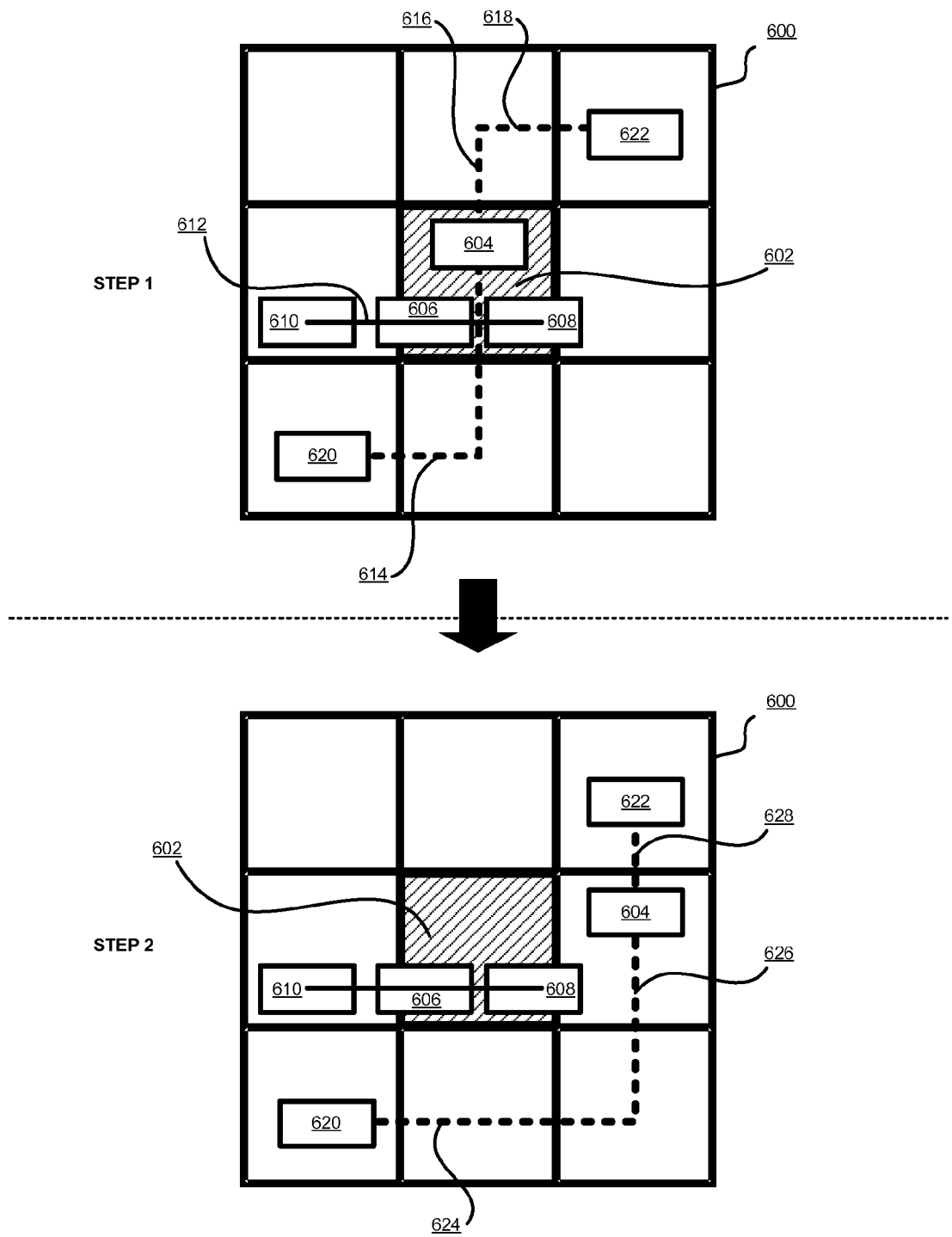
FIG. 6 depicts a block diagram of a modified process of object re-placement using connection weighting in accordance with an illustrative embodiment.

With reference to FIG. 6, this figure depicts a block diagram of a modified process of object re-placement using connection weighting in accordance with an illustrative embodiment. Rendering 600 may be a rendering of an example design, such as rendering 500 in FIG. 5.

In addition to the process of object resizing described with respect to FIG. 5, or instead of the object resizing process, an illustrative embodiment may control how the objects are re-placed based on a variety of parameters. For example, as in this figure, assume that rendering 600 includes area 602 that is occupied fully or partially by objects 604, 606, and 608. The illustrative embodiment determines that area 602 is congested.

Further assume that a component in object 610 is connected to a component in objects 606 and 608 using wire 612. Wire 612 is a straight horizontal (X axis) wire that crosses over area 602 as depicted.

Further assume that a wire formed using horizontal (X axis) wire segment 614, vertical (Y axis) wire segment 616, and horizontal (X axis) wire segment 618 connects certain pins of objects 620, 604, and 622. Vertical wire segment 616 crosses over area 602 as depicted.

In order to remove, reduce, or otherwise remedy the congestion in area 602 the illustrative embodiment has to re-place some objects from area 602. However, if either of objects 606 or 608 is re-placed anywhere in rendering 600, the length of wire 612 will increase. Increase in a wire length is an effect of re-placement that may be undesirable under certain circumstances. Consequently, in order to remove congestion, a vertical wire should be considered for re-positioning away from area 602.

According to the illustrative embodiments, such a limitation that permits movement of vertical wires but restricts movement of horizontal wires, or vice versa, can be achieved by increasing the cost of the wire length that should not be moved. In the case depicted in this figure, artificially increasing the cost of horizontal wire length will cause an IC design tool to determine that cost of re-positioning wire 612 is greater than the cost of re-positioning wire 616, even if both re-positioning result in the same increase in the respective wire lengths.

Consequently, configured in this manner of the illustrative embodiments, the IC design tool will re-position wire 616 by a preference over re-positioning wire 612. Step 2 of this figure depicts the result of re-positioning wire 616 as a result of this preference according to the illustrative embodiments.

In step 2 of this figure, re-positioning of wire 616 away from area 602 results re-placement of object 604 outside of area 602. The router removing wires 614, 616, and 618 of step 1 of this figure, and replacing them with wires 624, 626, and 628. Notice that the total wire length of wires 624, 626, and 628 that connect objects 620, 604, and 622 has not increased over the total wire length of wires 614, 616, and 618 in step 1 of this figure.

Further notice that by weighting or biasing the horizontal and vertical wires differently, object 604 is re-placed away from area 602, thereby reducing the congestion of area 602. Wire 612 remains in the same position, and objects 610, 606, and 608 connected by wire 612 remain in the same positions in step 2 as in step 1.

An implementation may combine the biasing of the illustrative embodiments with the resizing of the illustrative embodiments within the scope of the illustrative embodiments. For example, object 604 could also be artificially resized as in FIG. 5, in combination with weighting the horizontal wires as described in the example of FIG. 6. The implementation may thus achieve re-placement of object 604 that may be a consequence of the resizing or the weighting within the scope of the illustrative embodiments.

Figure 7:
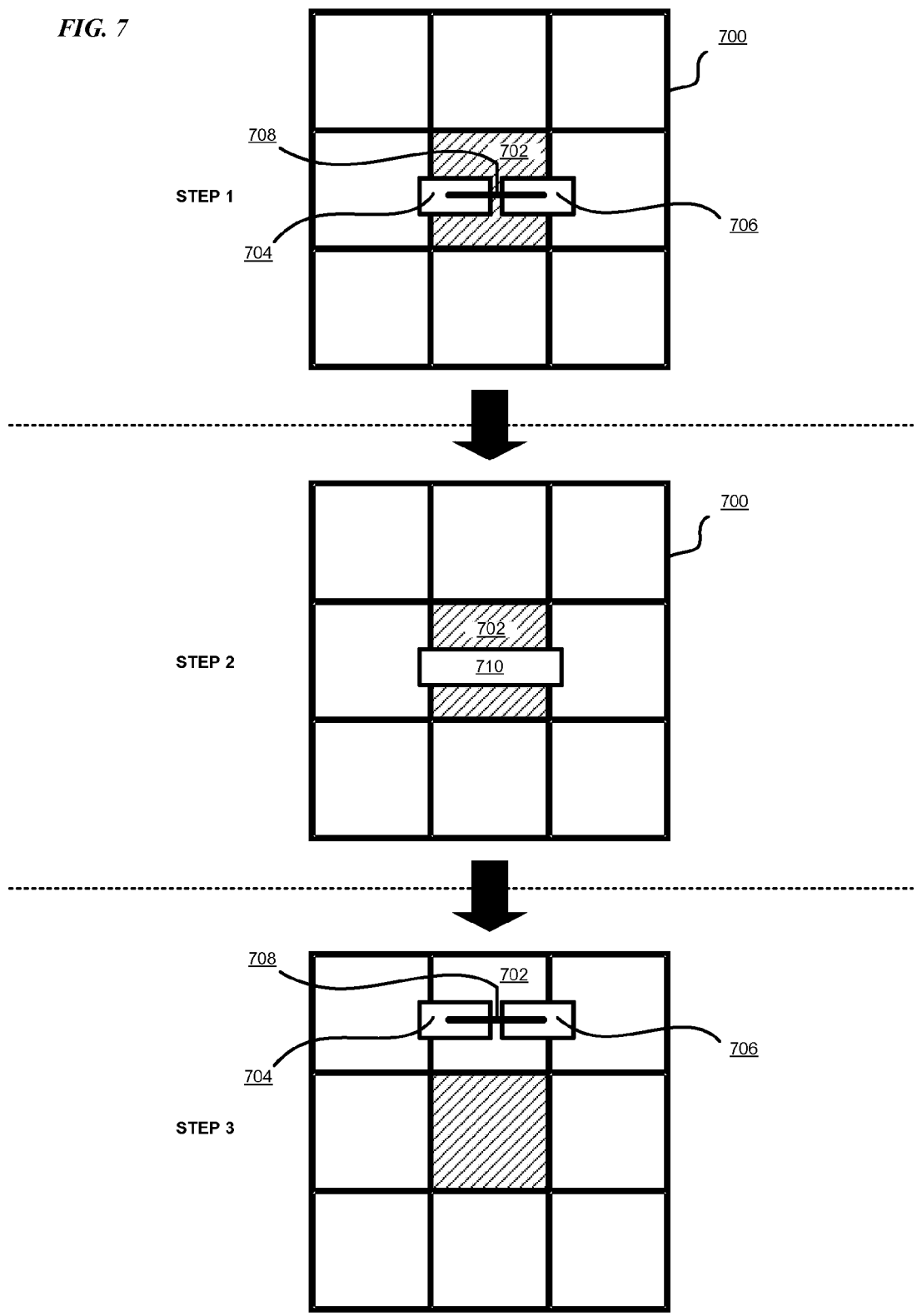
FIG. 7 depicts a block diagram of a second modified process of object re-placement using clustering of objects in accordance with an illustrative embodiment.

With reference to FIG. 7, this figure depicts a block diagram of a second modified process of object re-placement using clustering of objects in accordance with an illustrative embodiment. Rendering 700 may be a rendering of an example design, such as rendering 500 in FIG. 5.

In addition to or instead of the process of object resizing described with respect to FIG. 5, and in addition to or instead of the connection weighting process of FIG. 6, an illustrative embodiment may control how the objects are re-placed in additional ways. For example, as in this figure, assume that rendering 700 includes area 702 that is occupied fully or partially by objects 704 and 706. The illustrative embodiment determines that area 702 is congested.

Further assume that a component in object 704 is connected to a component in objects 706 using wire 708. Wire 708 is a straight horizontal (X axis) wire that crosses over area 702 as depicted. Furthermore, in the example design rendered as rendering 700, objects 704 and 706 may be such objects that have to remain adjacent to each other as depicted, connected with wire 708 as depicted. Objects 704 and 706 are chosen only as convenient examples for describing the illustrative embodiment and are not limiting on the illustrative embodiments. Any number of objects may be restricted in a similar manner and many designs with similar restrictions will be conceivable from this description.

Thus, when certain objects cannot move with respect to one another in a design, the illustrative embodiment of this figure provides a way to maintain their locations relative to one another but still be able to re-place them. According to the illustrative embodiment, as depicted in step 2 of this figure, objects 704 and 706 may be clustered together as cluster 710. Clustering two or more objects in the manner of the illustrative embodiment causes an IC design tool to move the cluster together and not the constituent objects individually.

As depicted in step 3 of this figure, cluster 710 of step 2 is moved to an area other than area 702, resulting in objects 704 and 706 remaining in the same position with respect to each other as they were in step 1. Objects 704 and 706 in the new area also remain connected using wire 708 as they were in step 1.

Thus, using the clustering separately or in combination with the resizing and the weighting, the illustrative embodiments enable re-placement of objects that are to be kept in the same relative position with respect to one another. Thus, clustering according to the illustrative embodiment enables moving objects that are presently unmovable because of wire length and other considerations.

Figure 8:
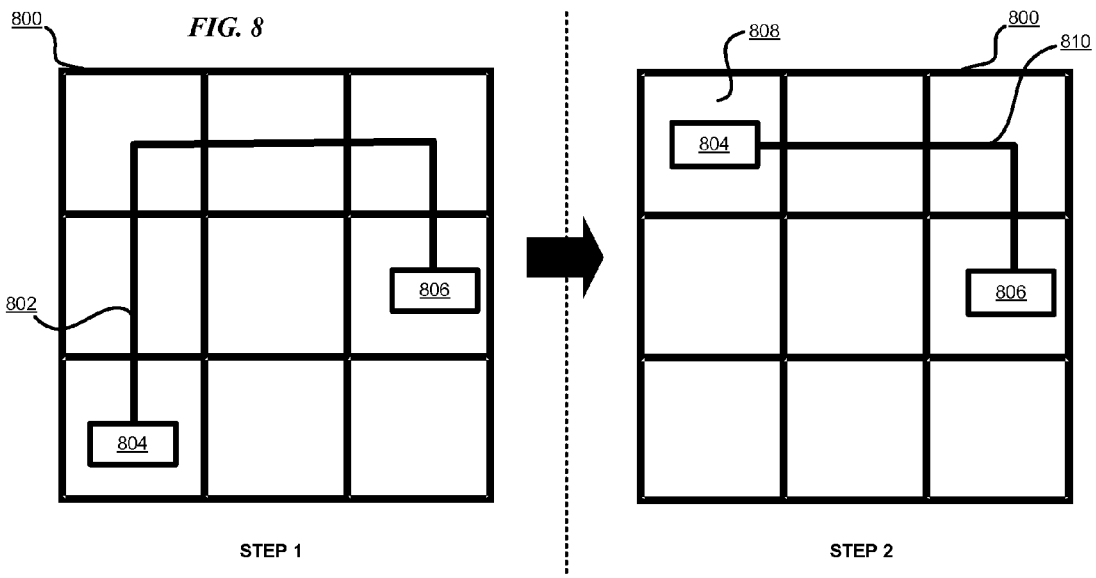
FIG. 8 depicts a block diagram of a third modified process of object re-placement using shortening of routes in accordance with an illustrative embodiment.

With reference to FIG. 8, this figure depicts a block diagram of a third modified process of object re-placement using shortening of routes in accordance with an illustrative embodiment. Rendering 800 may be a rendering of an example design, such as rendering 500 in FIG. 5.

In combination with or instead of the resizing embodiment, the weighting embodiment, and the clustering embodiment, an illustrative embodiment may control how the objects are re-placed in additional ways. For example, as in this figure, assume that rendering 800 includes a net that is detoured by a router through several areas. As an example, rendering 800 depicts net 802 that connects objects 804 and 806 and is routed via six areas of the grid. Recall that a router may detour a net due to layout restrictions, design constraints, or other limitations. Such lengthy routes in IC design are referred to as scenic routes.

According to the illustrative embodiment, one or more of the connected objects can be re-placed along the scenic route. As an example, step 2 of this figure depicts that object 802 has been moved to area 808 so as to eliminate one leg of route 802 of step 1. Performing this re-placement of object 802 reduces the wire length of new connection 810 in comparison with the length of wire 802 in step 1.

The illustrative embodiments recognize that shortening of routes in the manner of the illustrative embodiment of FIG. 8 cannot be achieved using the presently used placement estimation techniques. For example, an IC design tool implementing estimators based only on Steiner Trees or Rent's algorithm and without the benefit of the illustrative embodiments cannot perform the shortening of routes in the manner described here.

Figure 9:
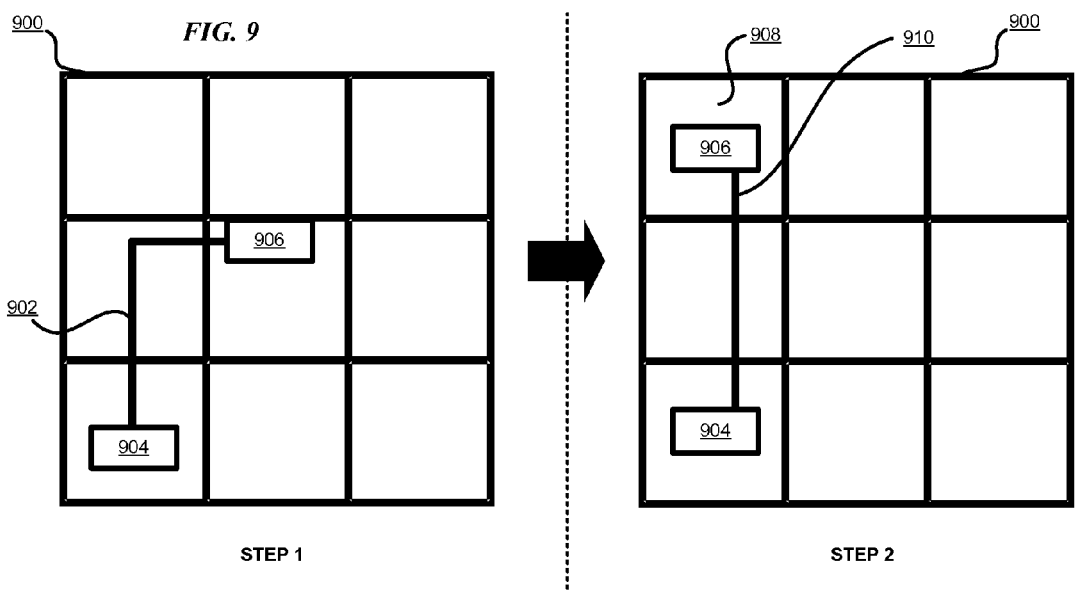
FIG. 9 depicts a block diagram of a fourth modified process of object re-placement using net straightening in accordance with an illustrative embodiment.

With reference to FIG. 9, this figure depicts a block diagram of a fourth modified process of object re-placement using net straightening in accordance with an illustrative embodiment. Rendering 900 may be a rendering of an example design, such as rendering 500 in FIG. 5.

In combination with or instead of the resizing embodiment, the weighting embodiment, the clustering embodiment, and the shortening of routes, an illustrative embodiment may control how the objects are re-placed in additional ways. For example, shown in step 1 of this figure is rendering 900 that includes net 902. Net 902 connects objects 904 and 906, and is routed via several areas in a design.

In accordance with an illustrative embodiment, an object can be moved to specifically eliminate bends in a wire. In the example depicted in this figure, in step 2, object 906 is moved to area 908 to eliminate the bend in net 902 that can be seen in step 1 of this figure.

In any given design, moving an object in a manner similar to the illustrative embodiment may cause the router to route a net in a straight line. Routing a net in a straight line may increase the wire length of the net, which may be undesirable in some cases, but may decrease the via count, which may be desirable in some cases. In certain circumstances, the trade-off between the wire length and the via count may favor making the change such that objects are connected in straight lines as much as possible.

An implementation may mix and match the resizing, the weighting, the clustering, the shortening, and the straightening embodiments as and when needed in an IC design process within the scope of the illustrative embodiments. For example, the resizing technique alone may be applied in a first re-placement iteration. A second iteration may employ a combination of resizing and weighting. A third iteration may employ only the clustering. Further iterations may employ other combinations of the illustrative embodiments. Such combinations of the techniques of the various illustrative embodiments are contemplated within the scope of the illustrative embodiments.

Figure 10:
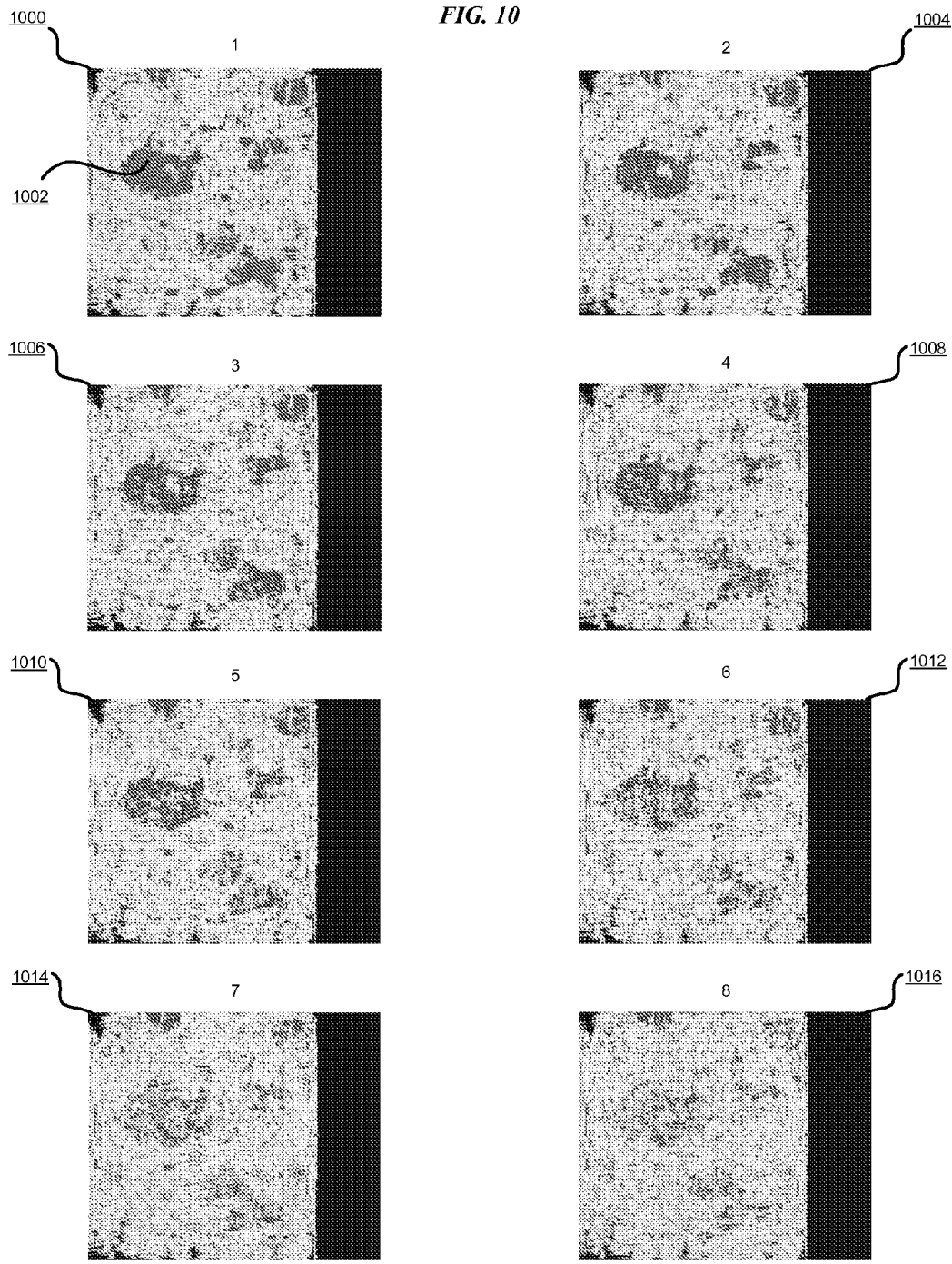
FIG. 10 depicts a series of renderings as modified by iterations of object re-placements in accordance with an illustrative embodiment.

With reference to FIG. 10, this figure depicts a series of renderings as modified by iterations of object re-placements in accordance with an illustrative embodiment. Rendering 1000 may be a rendering of an example design, such as rendering 500 in FIG. 5.

The example design of rendering 1000 is depicted as the design is progressively modified using one or more of the resizing, the weighting, the clustering, the shortening, and the straightening illustrative embodiments described here. Focusing on area 1002 as a target area of congestion, rendering 1000 in step 1 shows an area of a particular size where the rendered color is dark and dense.

Each of steps 2-8 is a rendering of a modified design, modified through use of one or more of the illustrative embodiments. Moving through steps 2 through 8, areas corresponding to area 1002, namely areas 1004, 1006, 1008, 1010, 1012, 1014, and 1016 respectively as depicted grow progressively lighter and less dense in comparison to area 1002 in step 1.

The progressive reduction in the darkness of the rendered color and the density of the color in those areas in an example way of rendering progressively reducing congestion in those areas. In one embodiment, a circuit designer can visually perceive the decrease in congestion. In another embodiment, the congested cells depicted by the dark colors can also be counted programmatically to determine whether the congestion has increased or decreased. Of course, an implementation may depict or measure increase or decrease in congestion in an IC design in any manner suitable for that implementation without departing from the illustrative embodiments. FIG. 11 depicts another example of statistically measuring congestion in a given IC design.

With reference to FIG. 11, this figure depicts a rendering of an IC design with a measurement of the reduced congestion in accordance with an illustrative embodiment. Rendering 1100 may be a rendering of an example design, such as rendering 500 in FIG. 5.

The example design of rendering 1100 is modified in one or more iterations to rendering 1102 using one or more of the resizing, the weighting, the clustering, the shortening, and the straightening illustrative embodiments described here. The congestion computed after global routing is used in this figure as a benchmark measurement for determining congestion, instead of a visual detection of the changed color or density of the congested areas.

For example, rendering 1100 is a rendering of the example design before one or more illustrative embodiments are applied to reduce the congestion therein. As an example, congestion can be measured as a percentage of a g-cell resources that a net uses when occupying the g-cell. A greater than one hundred percent usage informs that a net violates certain routing capacity constraints.

According to this example way of calculating congestion, the g-cells in a design can be arranged in an order of increasing congestion. A sampling of some of the worst congested g-cells, such as the top twenty percent of the g-cells so arranged, can provide an estimate of the worst congested areas in a design. Measurements associated with rendering 1100 show, in this example, that the wires routed in the top twenty percent worst congested g-cells occupied on average approximately ninety two percent of each of those cells' area. Twenty percent is used only as an arbitrary percentage and a measurement can use any percentage or another way of grouping of cells within the scope of the illustrative embodiments. Additionally, the measurement associated with rendering 1100 shows, as an example, that there were more than ten thousand cells where the nets passing there through exceeded ninety percent of the area of the cell.

After one or more illustrative embodiments have been executed for one or more iterations, rendering 1102 depicts a view of the same IC design, having a reduced amount of congestion as compared to rendering 1100. The same benchmark measurements are performed on rendering 1102 as were performed on rendering 1100.

In the example IC design depicted in this figure, measurements on rendering 1102 show that the wires routed in the area of the top twenty percent of the new most congested cell occupied approximately eighty eight percent of the such congested cell's area. Thus, executing one or more illustrative embodiments for one or more iterations is shown to have reduced the congestion in the most congested cells by nearly four and a half percent as compared to rendering 1100 before such execution.

Additionally, the measurement associated with rendering 1102 shows, as an example, that there were more less than six thousand four hundred cells where the nets passing there through exceeded ninety percent of the area of the cell. Thus, executing one or more illustrative embodiments for one or more iterations is shown to have reduced the number of cells where the nets passing through occupy more than ninety percent of the area by close to four thousand cells as compared to rendering 1100 before such execution.

With reference to FIG. 12, this figure depicts a rendering of an IC design with a measurement of the reduced pin density in accordance with an illustrative embodiment. Rendering 1200 may be a rendering of an example design, such as rendering 500 in FIG. 5.

The example design of rendering 1100 is modified in one or more iterations to rendering 1102 using one or more of the resizing, the weighting, the clustering, the shortening, and the straightening illustrative embodiments described here. The congestion computed after global routing is used in this figure as a benchmark measurement for determining congestion, instead of a visual detection of the changed color or density of the congested areas.

The example design of rendering 1200 is modified in one or more iterations to rendering 1202 using one or more of the resizing, the weighting, the clustering, the shortening, and the straightening illustrative embodiments described here. The indicators of pin density computed before and after executing the illustrative embodiments are used in this figure as the benchmark measurements for determining the pin density in the cells in the IC design. Measurements associated with rendering 1200 show, in this example, that the pins of the top twenty percent of the most congested cell occupied approximately eighty seven percent of such a congested cell's area. Twenty percent is used only as an arbitrary percentage and a measurement can use any percentage or another way of grouping of cells within the scope of the illustrative embodiments. Additionally, the measurement associated with rendering 1200 shows, as an example, that there were more than six thousand four hundred cells where the nets passing there through exceeded ninety percent of the area of the cell.

The measurements of some other indicators of pin density show that there are three hundred and sixty seven short circuits and three open circuits in the design of rendering 1200. The total wire length is four and eleven hundredths million units, and the time consumed in performing the routing is close to eleven hours.

After one or more illustrative embodiments have been executed for one or more iterations, rendering 1202 depicts a view of the same IC design, having a reduced pin density in the pin dense areas as compared to rendering 1200. The same benchmark measurements are performed on rendering 1202 as were performed on rendering 1100. The new measurements after executing the illustrative embodiments show that the pins of the top twenty percent of the new most congested cell occupied approximately eighty six percent of the most congested cell's area, down from eighty seven percent for rendering 1200. Additionally, the measurement associated with rendering 1202 shows, as an example, that there were only slightly more than five thousand one hundred cells where the nets passing there through exceeded ninety percent of the area of the cell, down from approximately six thousand four hundred for rendering 1200.

The measurements of other indicators of pin density show that there is only one short circuit, down from three hundred and sixty seven for rendering 1200. However, the number of open circuits has increased from three to forty in the design of rendering 1202. The total wire length is down to four million units, and the time consumed in performing the routing has been reduced to approximately seven and a half hours.

Thus, in this example design, executing the illustrative embodiments achieves an overall reduction in pin densities which are presently neither a consideration in IC design refinement for congestion, nor is achieved by the present solutions there for. The specific numbers and parameters described here are selected for the clarity of the illustrative embodiments and are not limiting on the illustrative embodiments. A particular implementation may select other parameters to measure congestion, pin density or other design considerations within the scope of the illustrative embodiments.

Figure 13:
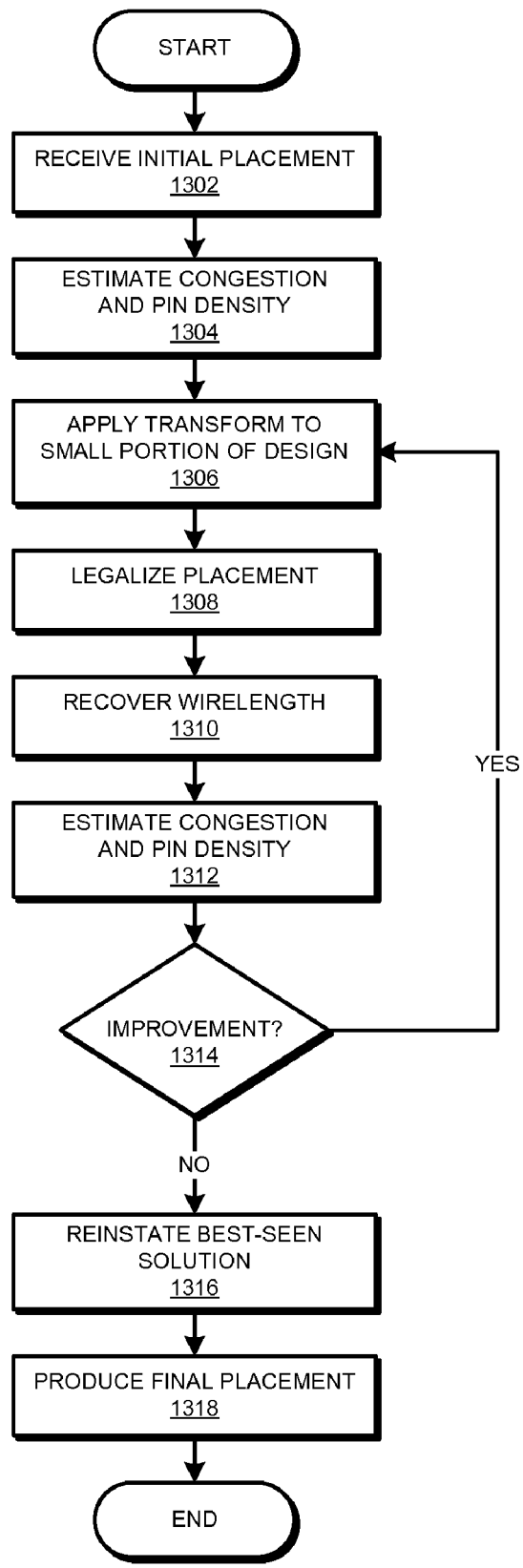
FIG. 13 depicts a flowchart of a process of improving the object placement in an IC design in accordance with an illustrative embodiment.

With reference to FIG. 13, this figure depicts a flowchart of a process of improving the object placement in an IC design in accordance with an illustrative embodiment. Process 1300 may be implemented in an IC design tool, such as IC design tool 113 in FIG. 1.

Process 1300 begins by receiving an initial placement (step 1302). The initial placement may be rendered as any of renderings 500 in FIG. 5, 600 in FIG. 6, 700 in FIG. 7, 800 in FIG. 8, 900 in FIG. 9, 1000 in FIG. 10, 1100 in FIG. 11, or 1200 in FIG. 12.

Process 1300 estimates congestion, pin density, or both in the initial placement (step 1304). In one embodiment, process 1300 may use a fast global router to perform step 1304. A fast global router is a type of global router that can perform global routing computations in a shorter than a threshold amount of time.

Process 1300 applies one or more transforms to the initial placement of step 1302 (step 1306). For example, process 1300 may employ one or more of the resizing, the weighting, the clustering, the shortening, and the straightening illustrative embodiments to transform and reduce the congestion, the pin density, or both in the initial placement of step 1302. Process 1300 may select all or a portion of the placement to apply the transformation.

Process 1300 legalizes the placement resulting from the transformation (step 1308). Process 1300 may recover the cumulative wire length of the transformed placement (step 1310). For example, result of step 1310 may be similar to the total wire length associated with rendering 1202 in FIG. 12. Reducing a wire length is called recovering a wire length. In one embodiment, process 1300 may compute or re-compute the cumulative wire length instead of or in addition to recovering the cumulative wire length within the scope of the illustrative embodiments.

Process 1300 estimates congestion, pin density, or both in the transformed and legalized placement (step 1312). In one embodiment, process 1300 may reuse the fast global router used to perform step 1304 to perform step 1312 as well.

Process 1300 determines whether the transformed placement is an improvement over the placement used in step 1306 (step 1314). Process 1300 may determine whether the transformed placement of step 1312 is an improvement over the placement used in step 1306 by determining if the congestion in a congested area of the placement has been reduced, the pin density of a pin-dense area has been reduced, total wire length of the transformed placement has been reduced, another parameter of the placement has improved, or some combination thereof.

Furthermore, process 1300 may use a threshold value of improvement in making the determination of step 1314. For example, process 1300 may consider the transformed placement an improvement over a previously transformed placement or an initial placement if the congestion in a congested area is reduced by at least two percent. As another example, a transformed placement may be an improvement over a previous placement if the pin density of a pin-dense area reduces by at least one percent. As another example, a transformed placement may be an improvement over a previous placement if the total wire length of all or a part of the placement is reduced by at least three percent.

If process 1300 determines that the transformed placement of step 1312 is an improvement ("YES" path of step 1314), process 1300 returns to step 1306. Process 1300 uses the presently transformed placement as the initial placement and executes steps 1306-1314 as a next iteration.

Process 1300 may determine that the transformed placement of step 1312 is not an improvement, or is not a significant improvement over a previous placement used in step 1306, ("NO" path of step 1314). If process 1300 so determines, process 1300 reinstates a placement solution from any of the previous iterations of steps 1306-1314 that demonstrated the values of congestion, pin densities, other design characteristics, or a combination thereof, that may be closest to the design specification (step 1316).

Process 1300 produces a final placement based on the reinstated placement solution (step 1318). Process 1300 ends thereafter. For example, in an embodiment, the final placement of step 1318 may be rendered as rendering 1102 in FIG. 11. In another embodiment, the final placement of step 1318 may be rendered as rendering 1202 in FIG. 12.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for an improved object placement in integrated circuit design. Using the illustrative embodiments, a manufacturer can automate the process of analyzing the placement of cells, components, or other objects in an IC design. The automation can be implemented as an enhancement to an existing IC design tool.

The automated processes of the illustrative embodiments can analyze congestion, pin densities, and other characteristics of the IC design. The illustrative embodiments provide several ways of modifying, transforming, altering, improving, changing, reconfiguring, re-placing, re-positioning, or otherwise manipulating the objects of a placement solution of the IC design. The several ways of manipulating objects in a given placement can be combined, repeated, or used in isolation as may be suitable for a particular implementation.

In one embodiment, the illustrative embodiments estimate and re-estimate congestion, pin densities, or a combination thereof using a fast global router. The illustrative embodiments may be implemented using any global router or other techniques for the estimation purposes.

The re-evaluation after a placement solution is manipulated allows the illustrative embodiments to revert to a previously found placement solution if subsequent iterations result in no improvement or deterioration of the placement solution. Furthermore, because the illustrative embodiments re-estimate the characteristics of the transformed placements, any unintended side-effects of a transformation can be caught early in the design process. For example, if improving general routing congestion results in a degraded detailed routing congestion, such situations can be identified early by using the illustrative embodiments. The illustrative embodiments have identified that such situations are not monitored suitably in the presently available IC design solutions.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for object placement in a design of an integrated circuit having cells, the cells including electronic components, wires, and pins defined for interconnections, the computer implemented method comprising:
   receiving an initial placement representing cells in the integrated circuit design corresponding to the design;
   estimating a characteristic of the initial placement, the characteristic weighted by one of (i) wiring congestion in an area of the initial placement, and (ii) pin density in an area of the initial placement;
   performing, at an application executing in a data processing system, a transformation on a part of the initial placement to form a transformed placement, the part including the area of the initial placement, the transformation improving the characteristic in the transformed placement as compared to the characteristic in the initial placement, the transformation including one of (i) resizing an object in the area to form a resized object such that the resized object is moved out of the area, and (ii) increasing a cost associated with a wire in the area such that another wire of a comparatively lower cost is moved out of the area;
   determining whether the characteristic has improved by at least a threshold value in the transformed placement by re-estimating the characteristic in the transformed placement; and
   producing a final placement corresponding to the transformed placement responsive to an improvement in the characteristic by at least the threshold value, the final placement representing a new design of the integrated circuit.

2. The computer implemented method of claim 1, further comprising:
   legalizing the transformed placement; and
   repeating performing the transformation responsive to the improvement in the characteristic, making the transformed placement the initial placement, producing a second transformed placement, and making the second transformed placement the transformed placement.

3. The computer implemented method of claim 1, wherein producing the final placement is performed if the characteristic in the transformed placement has improved above the threshold value of the improvement as compared to the characteristic in the initial placement but not above the threshold value as compared to the characteristic in a previous transformed placement.

4. The computer implemented method of claim 1, wherein the characteristic is congestion in the area, and wherein the improving the congestion in the area is reducing the congestion in the area in the transformed placement by a preset amount.

5. The computer implemented method of claim 1, wherein the characteristic is pin density in the area, and wherein the improving the pin density in the area is reducing the pin density in the area in the transformed placement by a preset amount.

6. The computer implemented method of claim 1, wherein the characteristic further includes a total wire length in a part of the design, and wherein the improving the characteristic includes reducing the total wire length in the transformed placement by a preset amount.

7. The computer implemented method of claim 1, wherein the estimating and the re-estimating are each performed using a global router component of an IC design tool.

8. The computer implemented method of claim 1 wherein the transformation includes clustering a plurality of objects in the initial placement to form a cluster such that the cluster is moved out of the area.

9. The computer implemented method of claim 1, wherein the transformation includes shortening a route taken by a second wire in the initial placement by moving a second object along the route out of the area, and wherein performing the transformation improves a global routing and a detailed routing using the transformed placement.

10. The computer implemented method of claim 9, wherein improving the global routing includes reducing the congestion in the area of the transformed placement, and wherein improving the detailed routing includes reducing the pin density in the area.

11. A computer usable program product comprising a computer usable storage device including computer usable code for object placement in a design of an integrated circuit having cells, the cells including electronic components, wires, and pins defined for interconnections, the computer usable code comprising:
   computer usable code for receiving an initial placement representing cells in the integrated circuit design corresponding to the design;
   computer usable code for estimating a characteristic of the initial placement, the characteristic weighted by at least one of (i) wiring congestion in an area of the initial placement, and (ii) pin density in an area of the initial placement;
   computer usable code for performing a transformation on a part of the initial placement to form a transformed placement, the part including the area of the initial placement, the transformation improving the characteristic in the transformed placement as compared to the characteristic in the initial placement, the transformation including one of (i) resizing an object in the area to form a resized object such that the resized object is moved out of the area, and (ii) increasing a cost associated with a wire in the area such that another wire of a comparatively lower cost is moved out of the area;
   computer usable code for determining whether the characteristic has improved by at least a threshold value in the transformed placement by re-estimating the characteristic in the transformed placement; and
   computer usable code for producing a final placement corresponding to the transformed placement responsive to an improvement in the characteristic by at least the threshold value, the final placement representing a new design of the integrated circuit.

12. The computer usable program product of claim 11, further comprising:
   computer usable code for legalizing the transformed placement; and
   computer usable code for repeating performing the transformation responsive to the improvement in the characteristic, making the transformed placement the initial placement, producing a second transformed placement, and making the second transformed placement the transformed placement.

13. The computer usable program product of claim 11, wherein producing the final placement is performed if the characteristic in the transformed placement has improved above the threshold value of the improvement as compared to the characteristic in the initial placement but not above the threshold value as compared to the characteristic in a previous transformed placement, wherein the characteristic is one of (i) congestion in the area, wherein the improving the congestion in the area is reducing the congestion in the area in the transformed placement by a preset amount, and (ii) pin density in the area, wherein the improving the pin density in the area is reducing the pin density in the area in the transformed placement by a preset amount.

14. The computer usable program product of claim 11, wherein the computer usable code for transformation includes computer usable code for clustering a plurality of objects in the initial placement to form a cluster such that the cluster is moved out of the area.

15. The computer usable program product of claim 11, wherein the transformation includes shortening a route taken by a second wire in the initial placement by moving a second object along the route out of the area, wherein performing the transformation improves a global routing and a detailed routing using the transformed placement, and wherein improving the global routing includes reducing the congestion in the area of the transformed placement, and wherein improving the detailed routing includes reducing the pin density in the area.

16. A data processing system for object placement in a design of an integrated circuit having cells, the cells including electronic components, wires, and pins defined for interconnections, the data processing system comprising:
   a storage device, wherein the storage device stores computer usable program code; and
   a processor, wherein the processor executes the computer usable program code, and wherein the computer usable program code comprises:
      computer usable code for receiving an initial placement representing cells in the integrated circuit design corresponding to the design;
      computer usable code for estimating a characteristic of the initial placement, the characteristic weighted by at least one of (i) wiring congestion in an area of the initial placement, and (ii) pin density in an area of the initial placement;
      computer usable code for performing a transformation on a part of the initial placement to form a transformed placement, the part including the area of the initial placement, the transformation improving the characteristic in the transformed placement as compared to the characteristic in the initial placement, the transformation including one of (i) resizing an object in the area to form a resized object such that the resized object is moved out of the area, and (ii) increasing a cost associated with a wire in the area such that another wire of a comparatively lower cost is moved out of the area;
      computer usable code for determining whether the characteristic has improved by at least a threshold value in the transformed placement by re-estimating the characteristic in the transformed placement; and
      computer usable code for producing a final placement corresponding to the transformed placement responsive to an improvement in the characteristic by at least the threshold value, the final placement representing a new design of the integrated circuit.

17. The data processing system of claim 16, further comprising:
   computer usable code for legalizing the transformed placement; and
   computer usable code for repeating performing the transformation responsive to the improvement in the characteristic, making the transformed placement the initial placement, producing a second transformed placement, and making the second transformed placement the transformed placement.

18. The data processing system of claim 16, wherein producing the final placement is performed if the characteristic in the transformed placement has improved above the threshold value of the improvement as compared to the characteristic in the initial placement but not above the threshold value as compared to the characteristic in a previous transformed placement, wherein the characteristic is one of (i) congestion in the area, wherein the improving the congestion in the area is reducing the congestion in the area in the transformed placement by a preset amount, and (ii) pin density in the area, wherein the improving the pin density in the area is reducing the pin density in the area in the transformed placement by a preset amount.

19. The data processing system of claim 16, wherein the computer usable code for transformation includes computer usable code for clustering a plurality of objects in the initial placement to form a cluster such that the cluster is moved out of the area.

20. The data processing system of claim 16, wherein the transformation includes shortening a route taken by a second wire in the initial placement by moving a second object along the route out of the area, wherein performing the transformation improves a global routing and a detailed routing using the transformed placement, and wherein improving the global routing includes reducing the congestion in the area of the transformed placement, and wherein improving the detailed routing includes reducing the pin density in the area.

* * * * *